United States Patent

[11] 3,630,668

| [72] | Inventors | John Wright Coulter-Black<br>Ville Jacques Cartier, Quebec;<br>John Douglas McIrvine, Mont-Saint-<br>Hilaire, Quebec; John Dudley Simpson,<br>Beooeil, Quebec, all of Canada |
|------|-----------|---|
| [21] | Appl. No. | 831,555 |
| [22] | Filed | June 9, 1969 |
| [45] | Patented | Dec. 28, 1971 |
| [73] | Assignee | Canadian Industries Limited<br>Montreal, Quebec, Canada |
| [32] | Priority | June 21, 1968 |
| [33] | | Great Britain |
| [31] | | 29,690/68 |

[54] MANUFACTURE OF SOLID MATERIALS IN A MOVING BED REACTOR
9 Claims, 1 Drawing Fig.

[52] U.S. Cl. ........................................... 23/103,
23/1 F, 23/106, 23/119, 23/129

[51] Int. Cl. ........................................... C05c 1/00

[50] Field of Search ............................................ 23/103,
119, 129–132, 106–107, 1, 288; 71/43; 75/9

[56] References Cited
UNITED STATES PATENTS

| 2,546,570 | 3/1951 | Vance, Jr. ................. | 23/1 X |
| 2,600,253 | 6/1952 | Lutz .......................... | 23/119 X |
| 2,783,249 | 2/1957 | Jaeger ....................... | 23/288 X |
| 3,156,538 | 11/1964 | Schneider.................... | 23/1 |

FOREIGN PATENTS

| 749,222 | 5/1956 | Great Britain................ | 23/1 |

Primary Examiner—Oscar R. Vertiz
Assistant Examiner—G. O. Peters
Attorney—Alexander O. McIntosh ABSTRACT: A process for manufacturing solid materials employing a reactor containing a moving bed of the product particles having separate reaction and cooling zones. One of the reactants is gaseous. The process can be employed for the manufacture of ammonium metabisulphite, ammonium nitrate and ammonium phosphate.

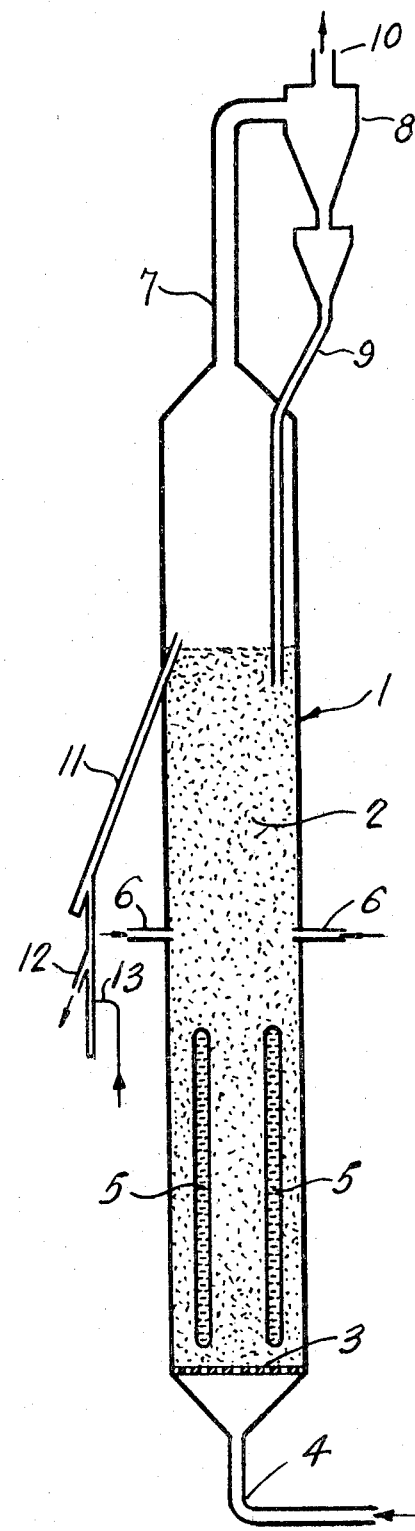

MANUFACTURE OF SOLID MATERIALS IN A MOVING BED REACTOR

This invention relates to the manufacture of solid materials in moving bed reactors.

It is common practice to prepare normally solid compounds by reactions carried out in liquid solvents. This type of preparation has the advantage of ease of transfer of materials but involves either removing the solvent from the solid or employing the product as a solution. The latter case however may entail the increased cost of shipping the solvent. There is thus an advantage to be gained by avoiding wherever possible the use of solvents in processes for the preparation of solid compounds.

There are numerous manufacturing processes wherein the avoidance of reactions in solution have distinct commercial advantage.

A material commonly employed in the pulp and paper industry as a reagent in ammonia-base pulping is an aqueous solution of ammonium bisulfite. However, the water present in such a solution adds considerably to the cost of transport so that a solid reagent is preferred. Ammonium metabisulfite, known also as ammonium pyrosulfite is available in solid form and constitutes a concentrated source of ammonium bisulfite which is economic to transport. It is to be noted that ammonium metabisulfite monohydrate is an isomer of ammonium bisulfite and is stable at room temperature.

However, in order to manufacture ammonium metabisulfite economically where transport is needed before use, it is clearly of advantage to avoid an aqueous solution process with attendant need to remove excess water. The desired result can be achieved by direct reaction of ammonia, sulfur dioxide and water vapor to form a solid product. When this reaction is carried out in the gaseous phase, however, operating difficulties are encountered. The reaction is exothermic and cooling of the reaction vessel is required in order to avoid decomposition of the ammonium metasulfite product. In practice, it is found that when a heat exchanger is employed, the product forms on the cooling surfaces with attendant reduction of heat transfer and difficulty in recovery of the product.

Another material of wide use as a fertilizer and as ingredient of explosives compositions is ammonium nitrate. This is commonly prepared by the neutralization of nitric acid with ammonia in aqueous solution. The water must be removed by evaporation in order to obtain the product in solid form. There is thus a clear advantage in carrying out the reaction employing a minimum amount of water.

Likewise ammonium phosphates, which are used widely as fertilizers, are prepared by neutralization of aqueous phosphoric acid solution with ammonia and evaporation of water. Commonly a significant part of the water is evaporated during granulation of the ammonium phosphate slurry.

It has now been found that materials formed by exothermic reactions can be prepared in solid, free flowing state free from solvent if the reaction is carried out in a moving bed of the product and/or an inert substance wherein the reaction zone is maintained in the interior of the bed and separate from a cooling zone. The maintenance of the reaction zone in the interior of the moving bed may be attained by introducing the reactants into the bed at separate positions. The reactants thus must traverse part of the moving bed before mixing.

It is therefore a primary object of this invention to provide a direct process for the manufacture of solid free flowing materials by reactions carried out in a moving bed. Additional objects will appear hereinafter.

The process of this invention for the manufacture of a solid free flowing material formed by an exothermic reaction comprises:

1. providing a bed of solid particles of the material and/or an inert substance wherein part of the bed forms a reaction zone and another part of the bed separate therefrom forms a cooling zone, 2. maintaining a circulation of particles between the reaction zone and the cooling zone by passage of gas through the bed, 3. maintaining the temperature of the particles in the reaction zone of the bed within the temperature range at which the reaction forming the material takes place, and 4. feeding the reactants to the reaction zone from at least two separate reactant inlets so that mixing of the reactants occurs in the reaction zone distant from the cooling zone, the proportions of reactants being adapted to provide the material which deposits on the surface of the moving particles of the bed.

The maintenance of the desired temperature in the reaction zone may be carried out either by a heat exchanger separated therefrom by being located upstream in the gas passing through the bed, or by evaporative cooling due to evaporation of a liquid introduced into the reaction zone either as a solvent for one of the reactants or separately to serve as cooling means. The cooling may be also be a combination of both methods.

When the process is applied to the manufacture of ammonium metabisulfate it comprises the steps of:

1. providing a bed of particles of solid ammonium metabisulfite and/or an inert substance having a reaction zone and a cooling zone, 2. maintaining a circulation of the particles between the reaction zone and the cooling zone by passage of gas through the bed, the reaction zone being downstream from the cooling zone, 3. maintaining the temperature of the particles of the bed within the range of 10° to 130° C. by a cooling means operating in the cooling zone of the bed, and 4. feeding to the reaction zone as reactants sulfur dioxide, ammonia and water vapor in such proportions that the molar ratio of sulfur dioxide to ammonia is at least 0.5:1.0 and the molar ratio of sulfur dioxide to water having a maximum value of 2.0:1.0 and a minimum value corresponding to the water content of the reactant gases which approaches saturation with respect to saturated ammonium bisulfite solution, the reaction forming ammonium metabisulfite which deposits on the surface of the particles of the bed.

In a preferred embodiment of the ammonium metabisulfite process, air or nitrogen is employed as fluidizing gas and the sulfur dioxide and water ingredients are mixed with the fluidizing gas prior to its entry into the fluidized bed. After the fluidizing gas containing the sulfur dioxide and water has traversed the cooling zone of the fluidized bed, the ammonia ingredient is added resulting in the formation of ammonium metabisulfite which deposits on the particles of the bed. The reaction taking place is believed to be represented by the expression $$2NH_3 + 2SO_2 + H_2O \rightarrow (NH_4)_2S_2O_5$$

and is exothermic. The heat produced is absorbed by the particles of the bed which in turn, through circulation of the bed, move to the zone containing the cooling means and are cooled. Optionally the off-gas from the reactor can be recycled. The gaseous reactants, ammonia, sulfur dioxide and water, normally will constitute from 8 to 25 percent by volume of the fluidizing gas. However, gases containing less than 0.2 percent total reactive species will form some solid ammonium metabisulfite. The sulfur dioxide reactant may be introduced into the bed as a component of a sulfur-dioxide-containing flue gas which serves also as the fluidizing gas.

When the process is applied to the manufacture of ammonium nitrate, the reactants preferably are gaseous ammonia and liquid nitric acid. In this case it is preferred to mix the gaseous ammonia with the fluidizing gas prior to its entry into the fluidized bed. The nitric acid is then sprayed into the reaction zone to react with the ammonia after the ammonia has traversed the cooling zone. It is desirable to maintain a stoichiometric excess of ammonia in the reaction zone.

It has been found that the degree of cooling required depends upon the water content of the nitric acid. When the nitric acid contains more than about 30 percent water the heat absorption due to evaporation of the water will be sufficient to cool the reaction zone sufficiently to deposit the solid product on the particles of the reactor bed. However, the use of evaporative cooling results in the introduction of water vapor into the off-gas and may complicate procedures for recycling unreacted ammonia.

The reaction proceeds satisfactorily in the temperature range 40° to 85° C., depositing solid ammonium nitrate product on the particles of the reactor bed.

The manufacture of ammonium phosphates (monoammonium phosphate, diammonium phosphate or mixtures of both) employing the process of the present invention is analogous to the above-described manufacture of ammonium nitrate. The ammonia gas is mixed with the fluidizing gas prior to its entry into the fluidized bed. The phosphoric acid is then sprayed into the reaction zone to react with the ammonia after it has traversed the cooling zone. The proportion of ammonia and phosphoric acid are controlled to provide the ammonium phosphate desired. With 65 percent phosphoric acid it is found that the absorption of heat by the evaporation of water is sufficient to maintain the temperature of the reactor particles in the operating range of 50°–90° C.

Although the preparation of only ammonium metabisulfite, ammonium nitrate and ammonium phosphates has been described above, the present invention is not limited to the preparation of said materials. Other materials formed by exothermic reactions such as ammonium sulfate and ammonium sulfite are likewise capable of being made by the process of the present invention.

It is preferred that the bed be formed of particles of the product. However, a bed of inert substance such as sand can also be used. Plainly this will result in a bed containing a mixture of particles of product and inert substance.

It is convenient to employ a fluidized bed of particles for the carrying out of the process of the invention. However, procedures employing spouted beds or slowly moving beds are also applicable to the process.

The cooling zone may be located in the same vessel as the reaction zone. Alternatively the cooling zone may be in a separate vessel with particle transfer means connecting the two vessels.

The fluidizing gas may itself be cooled prior to entrance into the fluidized bed.

The means for cooling the particles of the fluidized bed is preferably a heat exchanger located at the fluidizing gas inlet zone of the bed. Conveniently the heat exchanger is a system of vertically aligned water carrying tubes. It is essential that the heat exchanger or other cooling means be located remote from the reaction zone. If the product forming reaction takes place in the vicinity of the cooling means the product may deposit on the cooling surfaces and reduce heat transfer.

gas from duct 4 passes upwards. At 5 are seen two tubes of a water cooled heat exchanger. The heat exchanger removes heat from the surrounding fluidized particles in the lower or cooling zone of the reactor. At 6 are shown inlet ducts for introduction of a reactant into the upper or reaction zone of the fluidized bed. In practice the ammonia reagent will be introduced through ducts 6 while the sulfur dioxide and water vapor reagents will be mixed with the fluidizing gas entering by way of duct 4. The reaction takes place in the upper zone of the fluidized bed distant from the heat exchanger. However, the normal circulation of particles in the fluidized bed transfers the heated particles from the hot upper zone to the cooled lower zone thus controlling the reactor temperature. The off gas from the reactor passes through outlet duct 7 to cyclone 8 where solid ammonium metabisulfite is separated and returned to the reactor through column 9. The gas exhausts from the cyclone through duct 10 and can be recycled in the fluidizing gas system. Solid product is withdrawn from the top of the fluidized bed by fluidized bed seal leg 11 which is fitted with product outlet 12 and sealing and stripping gas inlet 13.

In the reactor illustrated, the product is withdrawn from the top of the bed. However, it is possible to withdraw the product also midway of the bed height or at the bottom of the bed. For certain applications bottom withdrawal of product may be preferred.

The invention is additionally illustrated by the following examples but the scope of the invention is not limited to the embodiment shown therein.

EXAMPLE 1

A fluidized bed reactor was built from a 6-inch-diameter glass tube 120 inches high. Approximately a 96-inch high filling (operating or expanded height) of 14-mesh ammonium metabisulfite was supported in the reactor by an aluminum perforated plate fitted across the lower end of the tube. The lower part of the reactor was fitted with a heat exchanger constituted by one section of 2-inch-diameter finned pipe and one section of 1-inch-diameter mild steel pipe. The fluidizing gas was air with which were mixed the sulfur dioxide and water vapor reagents prior to its entry into the reactor. The fluidizing gas was passed up through the fluidizing bed through the lower cooling zone at sufficient rate to maintain the bed in fluidized state. The ammonia reagent was introduced into the reactor through an inlet located downstream from the heat exchanger. The off gas from the reactor was passed through a scrubber and the ammonia in the gas determined. The sulfate content of the ammonium metabisulfite product also was determined. The results of six experiments are shown in table I.

TABLE I

| | Rate of flow of air, cu. ft./min. | Rate of flow of ammonium, cu. ft./min. | Rate of flow of sulphur dioxide, cu. ft./min. | Steam generator load, watts | Average bed Temp., ° C. | Yield based on ammonia | Sulphur dioxide efficiency, percent | Percent $SO_4$ in product |
|---|---|---|---|---|---|---|---|---|
| Experiment: | | | | | | | | |
| 1 | 29 | 2.5 | 2.6 | 735 | 75 | 44 | 42 | 0.8 |
| 2 | 26 | 2.55 | 2.5 | 810 | 70 | 43 | 44 | 0.55 |
| 3 | 40 | 2.5 | 2.5 | 860 | 75 | 32 | 32 | 0.65 |
| 4 | 22.4 | 2.5 | 2.5 | 730 | 65 | 45 | 45 | 0.55 |
| 5 | 31 | 3.0 | 3.0 | 740 | 72 | 31 | 31 | 0.55 |
| 6 | 22.5 | 0.2 | 0.31 | 380 | 25 | 80 | 65 | n.a. | n.a.=not available.

It is to be understood that the fluidized bed reactor will be equipped with means for removing the product such as a fluidized bed seal leg. Likewise the off-gas from the reactor which will contain fine particles of the solid product will pass through a separating means such as a cyclone or filter so that the solid may be separated and returned to the reactor.

An apparatus suitable for carrying out the process for the manufacture of ammonium metabisulfite is shown in the accompanying drawing which is a diagrammatic vertical sectional view of a fluidized bed reactor and auxiliary equipment.

Referring to the drawing, a tubular reactor is shown generally at 1. Reactor filling 2 of particles of the product is supported by perforated cross plate 3 through which fluidizing During the course of experiment 2, two samples of product were removed and analyzed. The results are as follows:

| $NH_3$ % | $SO_2$ % | $SO_4$ % |
|---|---|---|
| 19.06 | 67.71 | 0.77 |
| 19.34 | 67.26 | 0.89 |

Theoretical values for $(NH_4)_2S_2O_5$ are $NH_3$=18.90 percent; $SO_2$=71.09 percent; $SO_4$=nil.

EXAMPLE 2

Employing the apparatus of example 1 an experimental preparation of ammonium metabisulfite was carried out lasting 20 hours. The product was examined at intervals during the preparation. The results are shown in table II.

TABLE II

| Time, hrs: | Flow rate cu. ft. per minute | | | Steam generator load, kw. | Average bed temp.,° C. | Production rate, lbs./hr. | Percent SO₄ in product | Particle size of product, inches |
|---|---|---|---|---|---|---|---|---|
| | Air | Ammonia | Sulphur dioxide | | | | | |
| 0 | 22 | 2.5 | 2.5 | 0.63 | 53 | | | |
| 1 | 22.8 | 2.5 | 2.5 | 0.77 | 61 | 14.6 | 0.71 | 0.026 |
| 5 | 22.8 | 2.5 | 2.5 | 0.77 | 68 | 16.1 | 1.24 | 0.027 |
| 9 | 22.8 | 2.5 | 2.5 | 0.77 | 70 | n.a. | 0.84 | 0.05 |
| 13 | 22.8 | 2.5 | 2.5 | 0.77 | 72 | 14.8 | 0.92 | 0.041 |
| 17 | 22.8 | 2.5 | 2.5 | 0.77 | 80 | 12 | 1.91 | 0.05 |
| 20 | 22.8 | 2.5 | 2.5 | 0.77 | 80 | 13.8 | 2.72 | 0.059 | n.a. = not available.

EXAMPLE 3

An apparatus as described in example 1 was modified for the carrying out of the reaction of gaseous ammonia and aqueous nitric acid to form solid ammonium nitrate. The fluidizing gas was air and to this was mixed the ammonia reactant prior to the entrance of the gas into the bottom of the reactor. The liquid aqueous nitric acid was sprayed into the fluidized bed of ammonium nitrate above the position of the heat exchanger. It was found that when evaporative cooling of the bed was sufficient to control the reaction temperature the heat exchange could be removed. The results of five experiments are shown in table III.

TABLE III

| Experiment: | Rate of flow of air cu. ft./min. | Rate of flow of ammonia cu. ft./min. | Rate of flow of nitric acid gal./hr. | Nitric acid strength, weight percent | Bed temp., °C. | Type of cooling | Efficiency, percent based on NH₃ | Efficiency, percent based on HNO₃ |
|---|---|---|---|---|---|---|---|---|
| 1 | 23.8 | 1.67 | 1.04 | 96 | 80 | HE | 65 | 76 |
| 2 | 30.3 | 1.46 | 1.20 | 96 | 75 | HE | 67 | 85 |
| 3 | 39.5 | 1.97 | 1.15 | 96 | 60 | HE | 16 | 32 |
| 4 | 34.5 | 2.03 | 0.92 | 68 | 45 | EV | | 84 |
| 5 | 30.0 | 1.17 | 0.74 | 68 | 50 | EV | 71 | 88 |

HE = Heat exchanger.   EV = Evaporation.

EXAMPLE 4

Employing the apparatus of example 3 with the heat exchanger removed ammonia and orthophosphoric acid were reacted to form a mixture of monoammonium phosphate and diammonium phosphate. As in Example 3 the air and gaseous ammonia were introduced through the bottom of the reactor and aqueous orthophosphoric acid was sprayed into the fluidized bed of ammonium phosphate particles midway up the fluidized bed. In two experiments carried out evaporative cooling was sufficient to control the temperature of the fluidized bed. The results are given in table IV.

TABLE IV

| Experiment: | Duration of experiment (hrs.) | Rate of flow of air (cu. ft./min.) | Rate of flow of ammonia (cu. ft./min.) | Rate of flow of phosphoric acid (grams/hr.) | Phosphoric acid strength, weight percent | Bed temperature, °C. | Type of cooling | Production rate lbs./hr. | Efficiency based on ammonia, percent | Efficiency based on phosphoric acid, percent |
|---|---|---|---|---|---|---|---|---|---|---|
| 1 | 1¼ | 34.4 | 2.3 | 1.09 | 65 | 50 | EV | 11.7 | 52.7 | 96.5 |
| 2 | 1¼ | 24.2 | 1.55 | 1.13 | 65 | 50 | EV | 11.7 | 57.5 | 97.0 |

EV = evaporation.

EXAMPLE 5

Employing the apparatus of example 1 the process was carried out employing low concentrations of sulfur dioxide and ammonia reactants. These reactants were diluted with air to obtain the desired concentration. As in example 1 the sulfur dioxide was contained in the fluidizing gas and the ammonia was introduced adjacent to the reaction zone. The results are shown in table V. It is to noted that the sulfur dioxide concentration in the outlet gases is less than 0.005 percent.

TABLE V

| Experiment: | Air flow, cu. ft./min. | Inlet SO₂ conc. percent | Inlet NH₃ conc. percent | Inlet H₂O conc. percent | Outlet SO₂ conc. percent | Outlet NH₃ conc. percent | Bed temperature, °C. | Production Rate, lb./hr. |
|---|---|---|---|---|---|---|---|---|
| 1 | 41 | 0.2 | 0.3 | 1.1 | <0.005 | 0.12 | 28 | 1.2 |
| 2 | 41 | 0.08 | 0.08 | 0.39 | <0.005 | <0.02 | 12 | 0.4 |

What we claim is:

1. A process for the manufacture of solid free flowing material by exothermic reaction comprising
    1. providing a bed of solid particles of the material and/or an inert substance wherein part of the bed forms a reaction zone and another part of the bed separate therefrom forms a cooling zone,
    2. maintaining a circulation of particles within the bed between the reaction zone and the cooling zone by passage of gas through the bed, thus transferring heat from the reaction zone to the cooling zone,
    3. cooling the particles in the cooling zone so as to maintain the temperature of the particles in the reaction zone of the bed within the temperature range at which the reaction forming the material takes place, and
    4. feeding the reactants to the reaction zone from at least two separate reactant inlets so that mixing of the reactants occurs in the reaction zone distant from the cooling zone, the proportions of the reactants being adapted to provide the material which deposits on the surface of the moving particles of the bed.

2. A process as claimed in claim 1 wherein the material is ammonium metabisulfite, the bed temperature lies in the range 10° to 130° C., and the reactants are sulfur dioxide, ammonia and water vapor in such proportions that the molar ratio of sulfur dioxide to ammonia is at least 0.5:1.0 and the molar ratio of sulfur dioxide to water has a maximum value of 2.0:1.0 and a minimum value corresponding to the water content of the reactant gases, said water content approaching saturation with respect to saturated ammonium bisulfite solution.

3. A process as claimed in claim 2 wherein the sulfur dioxide reactant is introduced into the bed in admixture with the gas employed to circulate the bed particles.

4. A process as claimed in claim 3 wherein the sulfur dioxide reactant is introduced into the bed as a sulfur-dioxide-containing flue gas.

5. A process as claimed in claim 1 wherein the material is ammonium nitrate, the bed temperature lies in the range 40° to 85° C., and the reactants are ammonia and liquid nitric acid in equimolar proportions.

6. A process as claimed in claim 5 wherein the ammonia reactant is introduced into the bed in admixture with the gas employed to circulate the bed particles.

7. A process as claimed in claim 1 wherein the material is monoammonium phosphate and/or diammonium phosphate, the bed temperature lies in the range 50° to 90° C., and the reactants are ammonia and phosphoric acid in the stoichiometric proportions corresponding to the ammonium phosphate reaction product.

8. A process as claimed in claim 7 wherein the ammonia reactant is introduced into the bed in admixture with the gas employed to circulate the bed particles.

9. A process as claimed in claim 1 wherein the gas employed to circulate the bed particles is air or nitrogen.

* * * * *